(No Model.)
B. DALE.
TROLLEY.
No. 552,631. Patented Jan. 7, 1896.
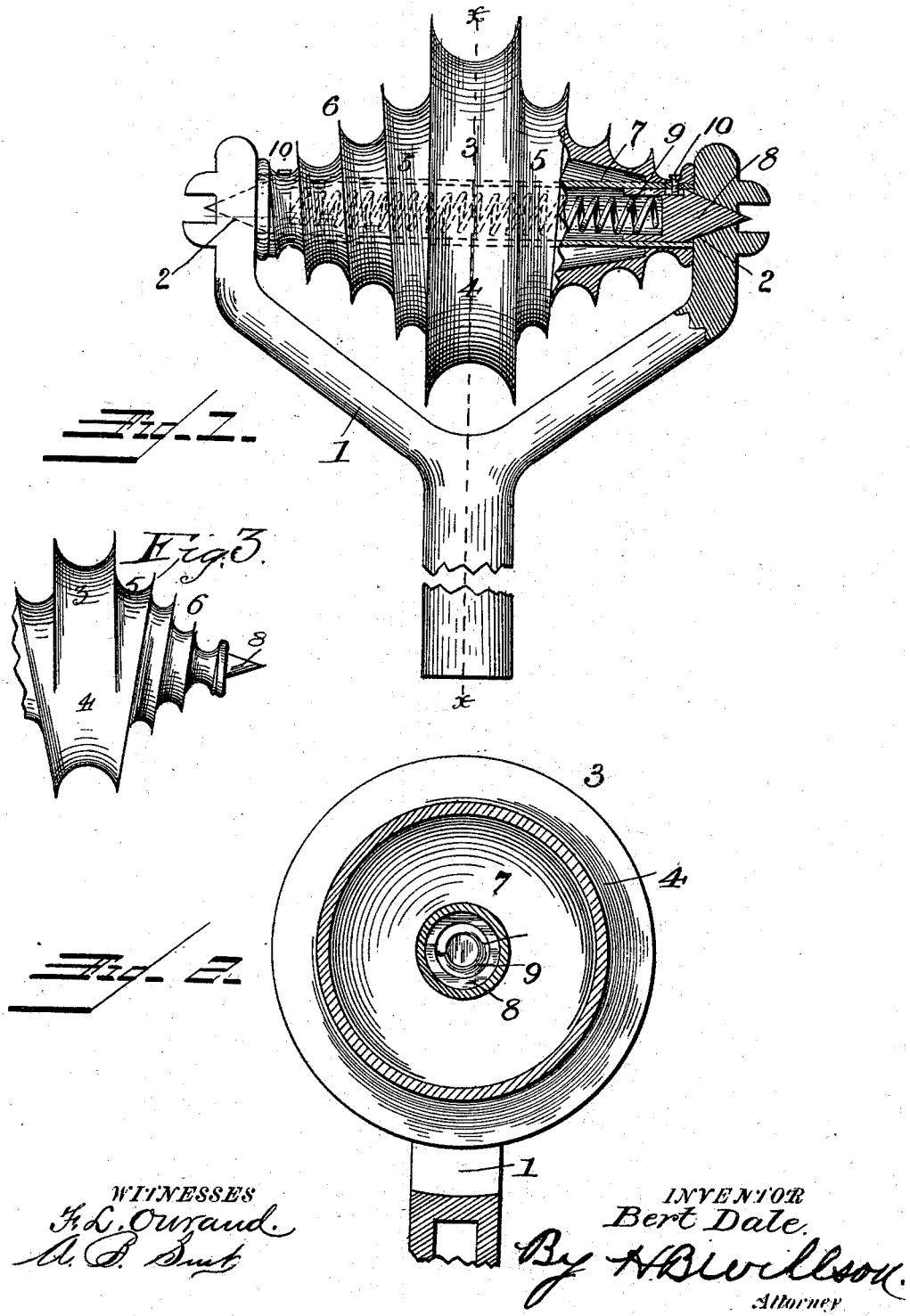
WITNESSES
F. L. Ourand.
A. P. Smit
INVENTOR
Bert Dale.
By H. B. Willson.
Attorney

UNITED STATES PATENT OFFICE.

BERT DALE, OF MILWAUKEE, WISCONSIN.

TROLLEY.

SPECIFICATION forming part of Letters Patent No. 552,631, dated January 7, 1896.

Application filed May 9, 1895. Serial No. 548,699. (No model.)

*To all whom it may concern:*

Be it known that I, BERT DALE, a citizen of the United States, residing at Milwaukee, in the county of Milwaukee and State of Wisconsin, have invented certain new and useful Improvements in Trolleys; and I do declare the following to be a full, clear, and exact description of the invention, such as will enable others skilled in the art to which it appertains to make and use the same.

My invention relates to trolleys, and more particularly to that class employed in connection with overhead electric-railway systems.

The object of my invention is to provide self-adjusting bearing-spindles of peculiar construction, whereby the wear will be automatically compensated for.

With these objects in view the invention consists of certain features of construction and combination of parts, which will be hereinafter fully described and claimed.

In the drawings, Figure 1 is a front elevation of my improved trolley. Fig. 2 is a transverse sectional view. Fig. 3 is a side elevation of a portion of the trolley-wheel, showing the spiral groove where it enters the central groove.

1 denotes the trolley-arm, having in its forked ends conical bearing-apertures 2.

3 denotes the trolley-wheel, which is provided with the usual central groove 4, which is intersected by spiral grooves 5 in the conical side extensions 6 of the wheel. A sleeve 7 is passed through the wheel, which is cast hollow and located in the sleeve, and projecting outward through the ends thereof into the bearing apertures 2 are conical bearings 8, the inner ends of which are of tubular form to receive the ends of a coil-spring 9, the energy of which is exerted to thrust the bearings outward into the bearing-apertures 2.

To prevent the sleeve and the bearings rotating with respect to the wheel, and at the same time to allow a free lateral movement of the bearings, I provide set-screws 10, which pass through holes in the wheel and sleeve and engage a longitudinal slot or recess in the bearings.

A trolley thus constructed will very rarely leave the wire, owing to the fact that should the central groove leave the wire it will be guided back to the wire by either of the reversely-spiraled grooves, and owing to the width of the wheel it may be readily brought into contact with the wire while the car is under way.

By providing the wheel with this novel form of bearings, the tendency of the bearings becoming worn and allowing the wheel to accidentally drop out of the fork is entirely overcome.

Having thus described my invention, what I claim, and desire to secure by Letters Patent, is—

The combination with a forked trolley arm having conical apertures, a hollow trolley wheel, a sleeve extending entirely through the wheel, conical bearings located in said sleeve and engaging the conical apertures aforesaid, and provided in their sides with longitudinal slots or recesses and at their inner ends with tubular extensions, a spring located in said sleeve and having its ends seated in the tubular extensions of the conical bearings, and set screws passed through said wheel and sleeve and engaging the slots or recesses in the sides of the conical bearings, substantially as set forth.

In testimony whereof I affix my signature in presence of two witnesses.

BERT DALE.

Witnesses:
LORENZ F. WAGNER,
FRED R. HORNIG.